Patented Aug. 12, 1930

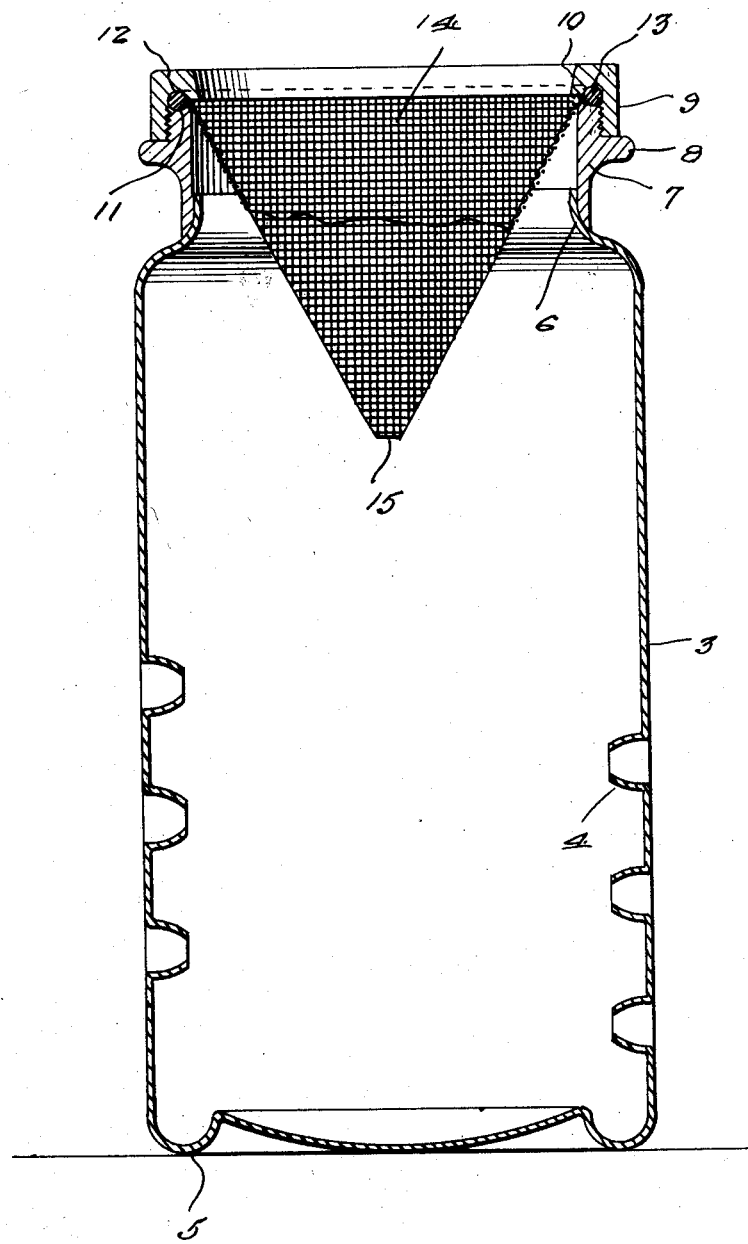

1,772,729

UNITED STATES PATENT OFFICE

GIULIO PISANI, OF NORTH BEND, PENNSYLVANIA

INSECT TRAP

Application filed March 9, 1929. Serial No. 345,649.

The present invention pertains broadly to that class of invention known as trapping, and more particularly the invention pertains to a novel fly vase for capturing flies or other crawling insects.

The principal object of this invention is to provide a trap of the character described, which, because of its extremely simple construction, can be manufactured at a cost within the economic demand of the public.

Another important object of the invention is to provide a trap of this nature wherein the parts may be easily assembled and disassembled.

Still another object of importance is to provide a trap which will be efficient and durable in use.

These and other objects of the invention will become more apparent to the reader after considering the invention as described and claimed hereinafter.

In the drawings:

The single view discloses the vertical sectional view through the entire invention.

Referring to the drawings, wherein like numerals designate like parts, the novel fly vase includes a cylindrical receptacle 3 provided in its side wall with a plurality of inwardly directed hollow conical projections 4, whereby the receptacle is thoroughly ventilated. The bottom of the receptacle is provided with an annular concentric shoulder 5, upon which the receptacle is adapted to rest. The upper portion of the receptacle is opened and provided with a reduced neck extension 6, to which is suitably secured a collar 7, having a circumferentially extending shoulder 8 and being externally threaded at its upper portion to threadedly receive the internally threaded rim 9, which rim is provided with an inwardly directed flange 10.

The upper edge of the collar 7 is provided with a circumferentially extending groove 11, while the rim 9 is provided with a like groove 12, these grooves being in juxta-position for receiving the reinforcing ring 13 at the upper edge of the foraminous inverted cone 14 when the rim 9 is secured in the position shown in the drawings. The upper edge of the cone is secured to the ring by welding, soldering, or by any other suitable fastening means or methods.

The inverted cone 14 has an opening at its apex portion 15 to permit the entrance of insects into the receptacle 3. It will thus be seen that insects entering through the apex opening of the cone 14 will find it difficult to regain the exterior of the receptacle and after a considerable number of the insects have been collected in the receptacle, a volume of water may be poured into the receptacle to drown the insects gathered therein, then the cone may be removed.

It is to be understood that numerous changes in the specific, shape, size and materials may be resorted to, in the construction of this novel insect trap, without departing from the spirit or scope of the invention as claimed hereinafter.

Having described the invention, what is claimed as new is:

1. An insect trap comprising a receptacle open at its top, the upper edge of said receptacle being grooved, a conical guide body open at its apex, reinforcing means at the edge of said body and being adapted for disposition within said groove, and a rim attachable to the upper portion of the container for securing the reinforcing means in the groove.

2. An insect trap comprising a receptacle open at its top, a threaded collar secured to the upper portion of the receptacle and provided with a shoulder extending circumferentially thereon, a conical body open at its apex, a rim for engagement with the threaded collar, an annulus secured to the base portion of the conical body, said rim and upper edge of the collar being provided with grooves for receiving the said annulus.

In testimony whereof I affix my signature.

GIULIO PISANI.